Figure 4:
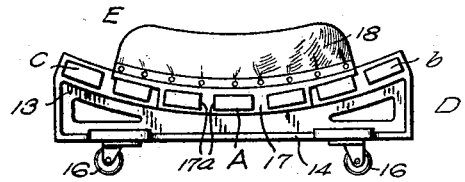

G. E. HILD.
COLLAPSIBLE, FOLDABLE CRAWLER FOR AUTOMOBILES.
APPLICATION FILED JUNE 18, 1915.
1,195,014.
Patented Aug. 15, 1916.
2 SHEETS—SHEET 1.
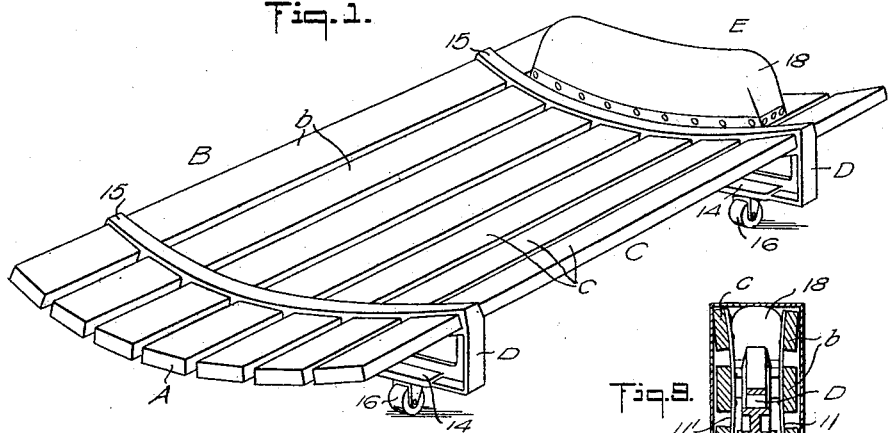
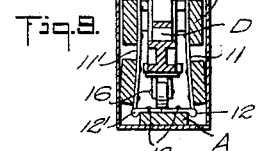
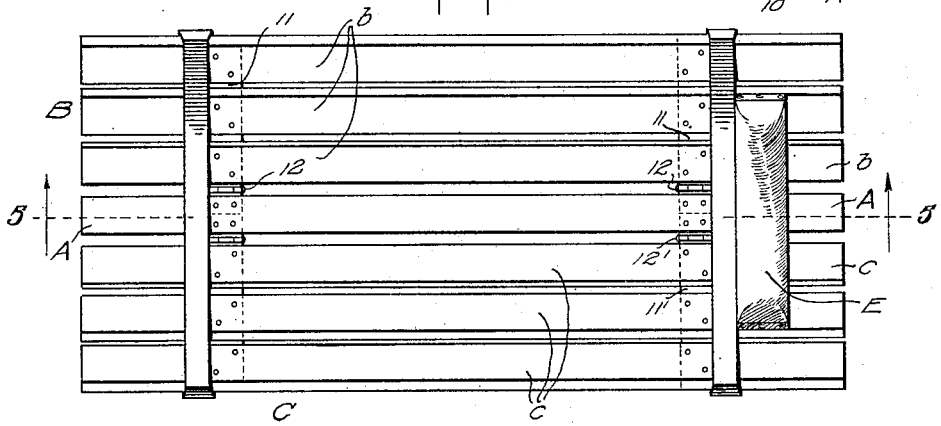
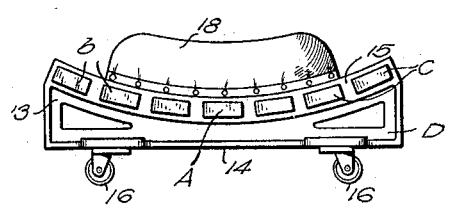
WITNESSES
INVENTOR
G. E. Hild
BY
ATTORNEYS G. E. HILD.
COLLAPSIBLE, FOLDABLE CRAWLER FOR AUTOMOBILES.
APPLICATION FILED JUNE 18, 1915.

1,195,014.

Patented Aug. 15, 1916.
2 SHEETS—SHEET 2.

WITNESSES

INVENTOR
G. E. Hild
BY
ATTORNEYS

UNITED STATES PATENT OFFICE.

GUSTAVE EMIL HILD, OF LYNDHURST, NEW JERSEY.

COLLAPSIBLE, FOLDABLE CRAWLER FOR AUTOMOBILES.

1,195,014. Specification of Letters Patent. Patented Aug. 15, 1916.

Application filed June 18, 1915. Serial No. 34,828.

*To all whom it may concern:*

Be it known that I, GUSTAVE E. HILD, a citizen of the United States, and a resident of Lyndhurst, in the county of Bergen and State of New Jersey, have invented a new and Improved Collapsible, Foldable Crawler for Automobiles, of which the following is a full, clear, and exact description.

This invention relates to automobile equipment, and has particular reference to repair apparatus.

Among the objects of the invention is to provide a device adapted to be collapsed and folded into small compass and carried normally in the vehicle, under one of the seats, such device being designed and constructed to enable the driver or other person to lie thereon, upon his back, and while in such position, transport himself, by manipulating his hands and feet, beneath the automobile for inspection and repairs or other purposes.

Another object of the invention is to provide a crawler for automobile practice that is easily transportable while in operative position, in any direction, and with the occupant lying close to the ground or roadway.

With the foregoing and other objects in view, the invention consists in the arrangement and combination of parts hereinafter described and claimed, and while the invention is not restricted to the exact details of construction disclosed herein, still for the purpose of illustrating a practical embodiment thereof reference is had to the accompanying drawings, in which like reference characters designate the same parts in the several views, and in which—

Figure 5:
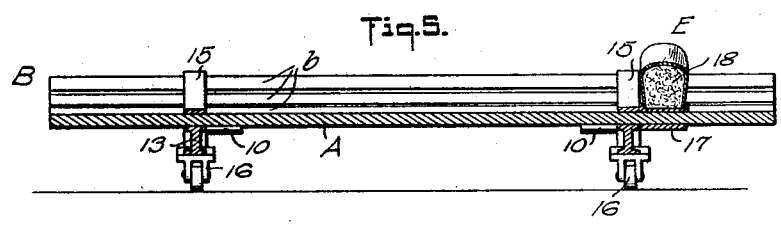
Figure 6:
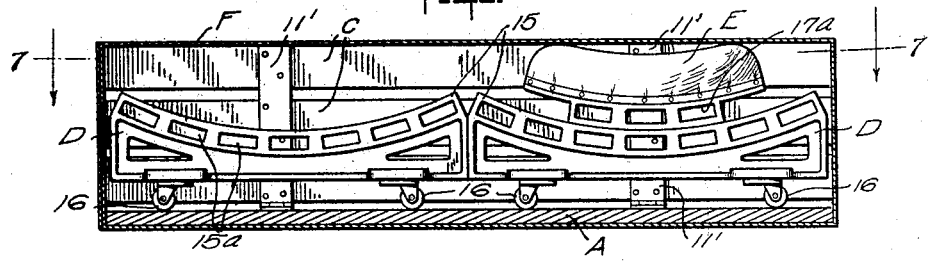
Figure 7:
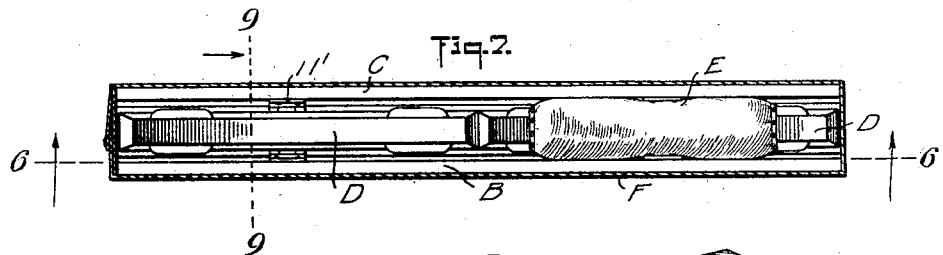
Figure 8:
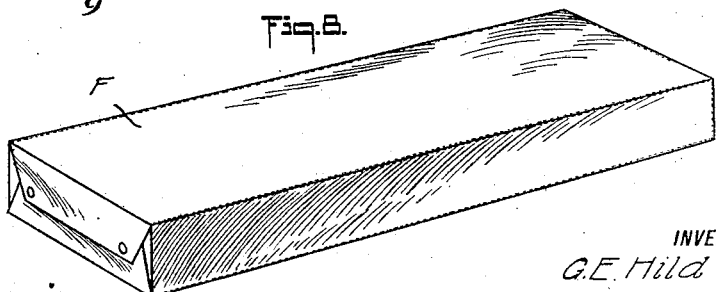

Figure 1 is a perspective view of the device in operative position; Fig. 2 is a plan view of the same; Fig. 3 is an end elevation looking toward the right in Fig. 2; Fig. 4 is an end elevation looking toward the left in Fig. 2; Fig. 5 is a vertical, longitudinal section on the line 5, 5 of Fig. 2; Fig. 6 is a vertical longitudinal section on the line 6, 6 of Fig. 7, the apparatus being collapsed and folded, and inclosed within the casing; Fig. 7 is a longitudinal section on the line 7, 7 of Fig. 6; Fig. 8 is a perspective view indicating the outside appearance of the device within its casing; and Fig. 9 is a vertical, transverse section on the line 9, 9 of Fig. 7.

Referring now more particularly to the drawings, I show a crawler comprising a bed consisting, as indicated, of three sections, denoted by the characters A, B and C, permanently hinged together.

The section A consists preferably of a single slat of unitary nature and of a length not to exceed the clear space beneath the vehicle seat. To the under surface of the slat A are secured pairs of hinged butts 10, the butts of each pair being arranged in transverse alinement, and the two pairs being spaced from the ends of the slat approximately one-third of the way toward the center.

The section B, which may be termed a wing, comprises a plurality of slats *b*, of the same length and preferably of the same cross sectional form as the slat A. The slats *b* are connected permanently in spaced relation to one another and to one edge of the slat A by means of flexible straps 11, pivoted at 12 to the respective butts 10 above described. The straps 11 are so shaped and tempered as to lie approximately flat and straight when in free position; but, because of their flexibility, they are adapted to be deflected in an arc of more or less curvature, as will be understood as the description progresses.

The section or wing C is similar to the wing B, and, hence, comprises a plurality of parallel spaced slats *c*, having associated therewith hinge straps 11', pivoted at 12' to the other butts 10 of the pairs first described, and hence in alinement with the respective straps of the wing B.

The bed structure as described, and including the three sections A, B and C, when opened out is of ample width to accommodate a man lying with his back thereon, but when folded occupies a very small cross sectional area which, for example, may be indicated as 2½ by 8 inches, while the length of the bed may be approximately 31 or 32 inches. This specification of dimensions, however, will be understood as being only for the purpose of illustration, and by no means as a limitation.

Coöperating with each end of the bed when in open position, is a frame D, comprising a rigid bracket 13 having a substantially flat or straight base 14 and a concave or arc-shape crown 15, shown herein as being made in the form of an arc of a circle of a shorter radius than the normal arc of curvature of the hinge straps 11 and 11'. The crown 15 is provided with a series of longitudinally disposed holes 15ᵃ, of a size neatly fitting over the free spaced ends of the bed slats, and hence seven in number to correspond with the design of the bed described. 16 indicates a pair of casters swiveled to the base 14 of the bracket, and as shown are free to rotate around vertical axes, whereby the wheels thereof are adapted to support the device in any position or while moving in any direction upon the roadway. This description of one of the frames D will be understood as being applicable to both. The length of the frames is substantially equal to the width of the bed when expanded, and substantially one-half the length of said bed. The width of each frame is less than the width of the slat A.

At E, I show a head-rest or pillow, comprising a rigid frame 17, made of cast metal or its equivalent, of a length substantially equal to the width of five of the slats spaced as set forth, and having at the middle portion a series of three sockets or holes 17ᵃ, equal in size and form to the holes 15ᵃ, and adapted, hence, to receive therein three of the slats at the center of the bed. The head-rest also includes a padded portion 18, to support the head directly.

With the foregoing specific description of the mechanism, its manner of operation may be briefly summarized as follows: Each of the frames D is slipped upon one end of the bed, the holes 15ᵃ receiving the respective slat-ends, the hinge straps 11 and 11′ being sprung sufficiently to adapt the frame to the curvature of the brackets 13, and with the base and caster portions of the frames on the convex side of the bed. The frames are preferably pushed along the bed until they abut against the hinges, as shown in Fig. 2. The slight flexibility set up in the hinge members, together with the shape of the coöperating parts will thoroughly prevent any possibility of accidental displacement of either of the frames while in operation. The brackets, furthermore, serve to hold the bed in desired position, and the bed construction serves to hold the frames in proper upright position. After the frames are put in place, the head-rest is slipped upon the ends of the slat A and innermost slats b and c and against the head frame, as shown in Figs. 2 and 5. In this position, with the device arranged adjacent the vehicle on the roadway, the operator may lay himself upon the bed, with his face upward, and then, by easy manipulation of his hands or feet, he crawls beneath the vehicle, the casters readily responding to movement in any direction, for this purpose.

After the inspection or repair of the machine is completed, the operator conveys himself from beneath the same, while still lying upon the crawler. The device may then be collapsed and folded by an operation reverse to that just described. In the collapsing, the parts D and E are slipped from the ends of the slats and left loose. The center section A of the bed is then lifted directly upwardly, allowing the wings to fold downwardly with respect thereto, or with the bottom side of the bed inward in the folded position. The folded bed is then inverted, and the loose parts D and E are inserted therein, the frames lying end to end between the wings, as shown in Fig. 6; and the head rest is placed upon one of them, also within the space between the wings. The device thus collapsed and folded may then be slipped into a casing or bag F, of any suitable construction, but adapted to hold it in neat and closely nested form, easily handled and adapted to be slipped beneath one of the seats of the vehicle, ready for use at any time, in the manner already set forth.

I claim:

1. In a device of the character set forth, the combination of a bed comprising a plurality of sections permanently hinged together and comprising a plurality of spaced slats arranged parallel to the axes of the hinges, and a pair of rigid frames each comprising a bracket having a series of holes formed longitudinally therethrough adapted to slide over the ends of the slats aforesaid and thereby hold the sections from movement around the axes of the hinges, and a pair of casters carried by the base portion of each bracket.

2. In a crawler of the character set forth, the combination of a bed comprising a plurality of longitudinal sections including longitudinal parallel spaced slats and means pivotally connecting the sections permanently together for folding movement around axes parallel to the slats, the slats having free ends projecting longitudinally beyond the region of the hinges, rigid means adapted to slip over said free ends of the slats to points adjacent the hinges and extending transversely of the bed and embracing the slats aforesaid to hold the bed in operative position, and a series of wheels carried by said rigid means for supporting the same and the bed upon the ground.

3. In a crawler, the combination of a slat, a pair of wings hinged upon the opposite edges of said slat, said wings being of the same length as the slat and adapted to fold around the axes of the hinges toward each other, rigid members coöperating transversely with the slat and wings to hold the same in open operative position, said rigid means being adapted to lie in the space between the wings when folded, and a series of casters carried by said rigid means.

4. In an automobile crawler, the combination of a bed comprising a central longitudinal slat and a pair of wings hinged to the opposite edges of the slat and foldable around the axes of the hinges toward each other on one side of the slat, a pair of rigid members coöperating transversely of the bed, each rigid member comprising a bracket embracing one end portion of said slat and wings holding the same in definite open position, and a series of rollers carried by said brackets.

5. In an automobile crawler, the combination of a longitudinal slat and pairs of hinges, portions of each pair of hinges being connected to the slat, the other portions of each pair constituting flexible straps extending oppositely from each other, a pair of wings on opposite sides of the slat, each wing comprising a plurality of spaced members secured permanently and individually to said flexible straps, a pair of rigid transverse members coöperating with the slat and wings to hold the same in definite operative position, each rigid member having a series of longitudinal openings embracing said slat and spaced members and arranged in an arc of a circle, and a series of rollers carried by said transverse members.

In testimony whereof I have signed my name to this specification in the presence of two subscribing witnesses.

GUSTAVE EMIL HILD.

Witnesses:
 GEO. L. BEELER,
 PHILIP D. ROLLHAUS,

Copies of this patent may be obtained for five cents each, by addressing the "Commissioner of Patents, Washington, D. C."